(12) United States Patent
Horisawa et al.

(10) Patent No.: US 8,426,015 B2
(45) Date of Patent: Apr. 23, 2013

(54) CLEAR AND FLAME RETARDANT POLYCARBONATE RESIN FILM

(75) Inventors: Kazushi Horisawa, Osaka (JP); Koji Okada, Osaka (JP); Weijun Zhou, Freeport, TX (US)

(73) Assignee: Styron Europe GmbH, Horgen (CH)

( * ) Notice: Subject to any disclaimer, the term of this patent is extended or adjusted under 35 U.S.C. 154(b) by 596 days.

(21) Appl. No.: 12/600,450

(22) PCT Filed: Jun. 12, 2007

(86) PCT No.: PCT/JP2007/062466
§ 371 (c)(1),
(2), (4) Date: Nov. 16, 2009

(87) PCT Pub. No.: WO2008/152741
PCT Pub. Date: Dec. 18, 2008

(65) Prior Publication Data
US 2010/0151221 A1 Jun. 17, 2010

(51) Int. Cl.
*C08L 69/00* (2006.01)
*C08L 83/04* (2006.01)
*C08K 5/42* (2006.01)

(52) U.S. Cl.
USPC ............ 428/220; 428/412; 524/165; 524/860

(58) Field of Classification Search ........................ None
See application file for complete search history.

(56) References Cited

U.S. PATENT DOCUMENTS

| | | | |
|---|---|---|---|
| 3,775,367 A * | 11/1973 | Nouvertne | 524/165 |
| 3,956,235 A | 5/1976 | Pasternack et al. | |
| 3,971,756 A * | 7/1976 | Bialous et al. | 524/157 |
| 4,837,280 A | 6/1989 | Awaji et al. | |
| 4,939,186 A | 7/1990 | Nelson et al. | |
| 5,236,633 A | 8/1993 | Satake et al. | |
| 5,352,747 A | 10/1994 | Ohtsuka et al. | |
| 5,354,514 A | 10/1994 | Satake et al. | |
| 5,514,740 A | 5/1996 | Miyake et al. | |
| 5,807,908 A | 9/1998 | Hirose et al. | |
| 6,291,585 B1 | 9/2001 | Tomari et al. | |
| 6,433,050 B1 | 8/2002 | Shinomiya et al. | |
| 6,518,357 B1 | 2/2003 | Rajagopalan et al. | |
| 6,730,720 B2 | 5/2004 | Gohr et al. | |
| 7,449,506 B2 | 11/2008 | Sato | |
| 2007/0047077 A1 | 3/2007 | Browning | |
| 2009/0233100 A1 | 9/2009 | Nukui et al. | |
| 2009/0258170 A1 | 10/2009 | Kawagoshi et al. | |
| 2009/0326120 A1 | 12/2009 | Kawagoshi et al. | |
| 2010/0144939 A1 | 6/2010 | Okada et al. | |
| 2010/0148136 A1 | 6/2010 | Kawagoshi et al. | |

FOREIGN PATENT DOCUMENTS

| | | |
|---|---|---|
| EP | 0188792 A1 | 7/1986 |
| EP | 0216412 A1 | 4/1987 |
| EP | 0351875 A2 | 1/1990 |
| EP | 1188792 A1 | 3/2002 |
| EP | 0728811 B1 | 9/2003 |
| JP | 57-24186 A | 2/1982 |
| JP | 60-184559 A | 9/1985 |
| JP | 62-135556 A | 6/1987 |
| JP | 01-172801 A | 7/1989 |
| JP | 02-46855 A | 2/1990 |
| JP | 02-129261 A | 5/1990 |
| JP | 02-163156 A | 6/1990 |
| JP | 03-33115 A | 2/1991 |
| JP | 03-143950 A | 6/1991 |
| JP | 05-163400 A | 6/1993 |
| JP | 05-163405 A | 6/1993 |
| JP | 05-163408 A | 6/1993 |
| JP | 05-163426 A | 6/1993 |
| JP | 05-257002 A | 10/1993 |
| JP | 06-192556 A | 7/1994 |
| JP | 06-299035 A | 10/1994 |
| JP | 06-306265 A | 11/1994 |
| JP | 07-234304 A | 9/1995 |
| JP | 07-240187 A | 9/1995 |
| JP | 08-073653 A | 3/1996 |
| JP | 09-194711 A | 7/1997 |
| JP | 09-281307 A | 10/1997 |
| JP | 10-17705 A | 1/1998 |
| JP | 11-5241 A | 1/1999 |
| JP | 11-217494 A | 8/1999 |
| JP | 11-323120 A | 11/1999 |
| JP | 2000-156107 A | 6/2000 |
| JP | 2000-169695 A | 6/2000 |
| JP | 2001-200151 A | 7/2001 |
| JP | 2001-226575 A | 8/2001 |
| JP | 2001-316581 A | 11/2001 |
| JP | 2002-332401 A | 11/2002 |
| JP | 2003-154621 A | 5/2003 |
| JP | 2003-176404 A | 6/2003 |
| JP | 2004-510869 A | 4/2004 |

(Continued)

OTHER PUBLICATIONS

Franco, F. et al., "Theoretical Study of Structural and Electronic Properties of Methyl Silsequioxanes," *J. Phys. Chem. B*, 2002, vol. 106, pp. 1709-1713.

*Primary Examiner* — Maria Veronica Ewald
*Assistant Examiner* — Prashant J Khatri
(74) *Attorney, Agent, or Firm* — Brinks Hofer Gilson & Lione

(57) ABSTRACT

The disclosure relates to a polycarbonate resin film with excellent clarity and flame retardance. The compositions comprise 100 parts by weight of a polycarbonate resin (A). The compositions further comprise 0.10 to 0.18 parts by weight of an alkali metal or alkaline earth metal salt compound (B) of a perfluoroalkane sulfonic acid. The compositions further comprise 0.05 to 0.35 parts by weight of a silicone compound (C). The film has an average thickness of 200 to 500 µm, a degree of haze of 5% or lower as measured according to the conditions specified in JIS K7105, and a flame retardance of VTM-1 or VTM-0 at a thickness of 300 µm as measured according to the UL94 test specified by the Underwriters Laboratories (UL).

16 Claims, No Drawings

FOREIGN PATENT DOCUMENTS

| | | |
|---|---|---|
| JP | 2005-015659 A | 1/2005 |
| JP | 2005-082647 A | 3/2005 |
| JP | 2005-263911 A | 9/2005 |
| JP | 2006-063121 A | 3/2006 |
| JP | 2006-063122 A | 3/2006 |
| JP | 2006-078954 A | 3/2006 |
| JP | 2006-083309 A | 3/2006 |
| JP | 2006-089596 A | 4/2006 |
| JP | 2006-089599 A | 4/2006 |
| JP | 2006-124517 A | 5/2006 |
| JP | 2006-316149 A | 11/2006 |
| JP | 2007-002075 A | 1/2007 |
| JP | 2007-138010 A | 6/2007 |
| WO | WO 02-028970 A1 | 11/2002 |
| WO | 2007/020211 A | 2/2007 |

* cited by examiner

CLEAR AND FLAME RETARDANT POLYCARBONATE RESIN FILM

CROSS REFERENCE TO RELATED APPLICATIONS

This application claims the benefit of International Application No. PCT/JP2007/062466, filed Jun. 12, 2007, the disclosure of which is incorporated herein by reference.

FIELD OF THE INVENTION

The present invention relates to a polycarbonate resin film with excellent clarity and flame retardance, and more particularly to a polycarbonate resin film exhibiting a high degree of clarity and flame retardance obtained by adding, to a polycarbonate resin, specific amounts of an alkali metal or alkaline earth metal salt compound of a perfluoroalkane sulfonic acid and a silicone compound having a specific structure.

BACKGROUND OF THE INVENTION

Polycarbonate resins are thermoplastic resins with excellent impact resistance, heat resistance and the like and are used extensively in electrical, electronic, ITE, mechanical, automotive, building materials and other application areas. Polycarbonate resins are highly flame retardant plastic materials that possess self extinguishing properties. However, polycarbonate resin films with even better flame retardance corresponding to UL94 VTM-1 and VTM-0 are being sought in order to meet not only the requirements for exceptional clarity but also safety concerns in applications such as electrical insulation films and the like used in the field of electrical, electronic and ITE applications.

Methods employing the addition of halogenated compounds and phosphorus type compounds as flame retarding agents have previously been used to improve the flame retardance of polycarbonate resin films. The use of flame retarding agents, particularly those among them that do not contain bromine and chlorine type compounds, is desired by the market due to environmental concerns.

A flame retardant polycarbonate resin film that uses a special silicone compound containing a branched main chain structure was proposed as a substitute for flame retarding agents comprising halogen type compounds and phosphorus type compounds. (References 1 and 2) However, the problem was that the clarity was inferior to that of flame retardant polycarbonate resin films containing a flame retarding agent comprising a halogenated compound or a phosphorus type compound previously used. In addition, a flame retardant polycarbonate resin composition (Reference 3) using an organic siloxane containing alkoxy groups, vinyl groups and phenyl groups and an alkali (alkaline earth) metal salt of a perfluoroalkane sulfonic acid in order to improve the clarity was proposed. However, although the clarity improved, the flame retarding performance was only V-0 at a thickness of 1/16 inch (1.6 mm), and the film could not meet the stringent flame retardance requirements imposed on film applications.

Reference 1: Japanese Patent Application Public Disclosure No. 2007-2075
Reference 2: Japanese Patent Application Public Disclosure No. 2006-316149
Reference 3: Japanese Patent Application Public Disclosure No. H06-306265

Problems to be Solved by the Invention

The objective of the present invention is to present a polycarbonate resin film with a combination of high degrees of clarity and flame retardance without applying a bromine or chlorine compound or a phosphorus type compound.

Means to Solve the Problems

The inventors discovered that a polycarbonate resin film with both a high degree of clarity and flame retardance could be obtained without using a flame retarding agent comprising a bromine or chlorine type compound or a phosphorus type compound by adding specified amounts of an alkali metal or alkaline earth metal salt compound of a perfluoroalkane sulfonic acid and a silicone compound with a specified structure to a polycarbonate resin. The present invention was completed based on the discovery.

That is, the present invention presents a polycarbonate resin film, which is prepared by molding a resin composition, which comprises 100 parts by weight of a polycarbonate resin (A), 0.10 to 0.18 parts by weight of an alkali metal or alkaline earth metal salt compound (B) of a perfluoroalkane sulfonic acid and 0.05 to 0.35 parts by weight of a silicone compound (C), wherein a main chain of the silicone compound (C) is branched, the silicone compound (C) contains an organic functional group, the organic functional group includes essentially an aromatic group and may optionally include a hydrocarbon group other than aromatic group, wherein the film has:
(1) an average thickness of 200 to 500 μm,
(2) a degree of haze of 5% or lower as measured according to the conditions specified in JIS K7105, and
(3) a flame retardance of VTM-1 or VTM-0 at a thickness of 300 μm as measured according to the UL94 test specified by the Underwriters Laboratories (UL).

Advantages of the Invention

A polycarbonate resin film of the present invention exhibits excellent flame retardance without using a flame retarding agent comprising halogen or phosphorus and is extremely excellent from the standpoint of environmental harmony since a concern for generating a halogen containing gas during combustion is eliminated. In addition, the high degree of clarity the film also exhibits can contribute toward decreasing the time needed for assembly work and the like when the film is used as an electrical insulation film.

DETAILED DESCRIPTION OF THE INVENTION

The polycarbonate resin (A) used in the present invention is a polymer that can be produced using a phosgene method wherein various dihydroxy diaryl compounds and phosgene are allowed to react or using a transesterification wherein a dihydroxy diaryl compound and a carbonate ester such as diphenyl carbonate and the like are allowed to react. As a typical example, polycarbonate resins produced using 2,2-bis (4-hydroxyphenyl) propane (bisphenol A) can be cited.

As the dihydroxy diaryl compound described above, bis (hydroxyaryl) alkanes such as bis(4-hydroxyphenyl) methane, 1,1-bis(4-hydroxyphenyl)ethane, 2,2-bis(4-hydroxyphenyl) butane, 2,2-bis(4-hydroxyphenyl) octane, bis(4-hydroxyphenyl) phenyl methane, 2,2-bis(4-hydroxyphenyl-3-methylphenyl) propane, 1,1-bis(4-hydroxy-3-tertiary-butylphenyl) propane, 2,2-bis(4-hydroxy-3-bromophenyl) propane, 2,2-bis(4-hydroxy-3,5-dibromophenyl) propane, 2,2-bis(4-hydroxy-3,5-dichlorophenyl) propane and the like in addition to bisphenol A; bis(hydroxyaryl)cycloalkanes such as 1,1-bis(4-hydroxyphenyl)cyclopentane, 1,1-bis(4-hydroxyphenyl)cyclohexane and the like; dihydroxy diaryl ethers such as 4,4'-dihydroxy diphenyl ether, 4,4'-dihydroxy-3,3'-dimethyldiphenyl ether and the like; dihydroxy diaryl sulfides such as 4,4'-dihydroxy diphenyl sulfide and the like; dihydroxy diaryl sulfoxides such as 4,4'-dihydroxy diphenyl sulfoxide, 4,4'-dihydroxy-3,3'-dimethyl diphenyl sulfoxide and the like; and dihydroxy diaryl sulfones such as 4,4'-dihydroxy diphenyl sulfone, 4,4'-dihydroxy-3,3'-dimethyl diphenyl sulfone and the like may be cited.

These compounds may be used individually or as a mixture of at least two of them. In addition, piperazine, dipiperidyl hydroquinone, resorcinol, 4,4'-dihydroxy diphenyl and the like may also be mixed and used.

In addition, the dihydroxyaryl compounds described above and phenol compounds containing at least three hydroxyl groups as shown below may also be mixed and used. As the phenol containing at least three hydroxyl groups, fluoroglucine, 4,6-dimethyl-2,4,6-tri-(4-hydroxyphenyl) heptane, 2,4,6-dimethyl-2,4,6-tri-(4-hydroxyphenyl heptane, 1,3,5-tri-(4-hydroxyphenyl) benzol, 1,1,1-tri-(4-hydroxyphenyl)ethane, 2,2-bis-[4,4-(4,4'-dihydroxydiphenyl)cyclohexyl] propane and the like may be cited.

The viscosity average molecular weight of the polycarbonate resin (A) is ordinarily 10,000 to 100,000, preferably 15,000 to 35,000 and more preferably 17,000 to 28,000. When preparing such a polycarbonate resin (A), a molecular weight adjusting agent, a catalyst and the like may be used as needed.

As the alkali metal or alkaline earth metal salt compound (B) used in the present invention, alkali metal salts or alkaline earth metal salts of perfluoroalkane sulfonic acids may be cited. Ideally, the potassium salt of perfluorobutane sulfonic acid can be used.

The amount of the perfluoroalkane sulfonic acid alkali metal or alkaline earth metal salt compound (B) added is 0.10 to 0.18 parts by weight, preferably 0.13 to 0.16 parts by weight per 100 parts by weight of the polycarbonate resin (A). When the amount added is less than 0.10 parts by weight, the advantage of using it in combination with a silicone compound (C) is not observed. The flame retardance declines due to this reason, and this option is unfavorable. In addition, when the amount exceeds 0.18 parts by weight, the clarity declines, making this option unfavorable.

In the silicone compound (C) used in the present invention, the main chain of the silicone compound (C) is branched and the silicone compound (C) contains an organic functional group, in which the organic functional group includes (i) an aromatic group or (ii) an aromatic group and a hydrocarbon group other than aromatic group. The silicone compound (C) is shown by the chemical formula (I) below.

[Chemical Formula 1]

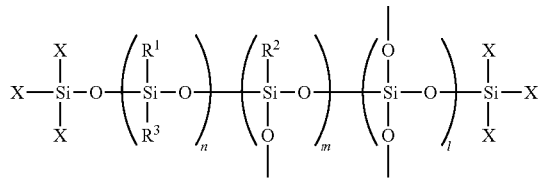

Here, $R^1$, $R^2$ and $R^3$ represent the organic functional groups on the main chain, and X represents a terminal functional group. That is, the compound is characterized by containing as branching unit a T unit ($RSiO_{1.5}$) and/or a Q unit ($SiO_{2.0}$). They are present in preferably at least 20 mole % of the entire siloxane units ($R_{3-0}SiO_{2-0.5}$). (R represents an organic functional group.) In addition, the silicone compound (C) preferably contains at least 20 mole % of aromatic groups in the organic functional groups present.

As the aromatic groups contained here, phenyl, biphenyl, naphthalene or their derivatives may be cited, but phenyl groups can ideally be used.

Of the organic functional groups in the silicone compound (C), hydrocarbon groups containing four or fewer carbon atoms are preferred and methyl groups ideally can be used as the organic groups other than aromatic groups attached to the main chain or branched side chains. Furthermore, the terminal groups are preferably a group selected from methyl, phenyl and hydroxyl groups or a mixture of two to three of these groups.

The average molecular weight (weight average) of the silicone compound (C) is preferably 3,000 to 500,000, more preferably 5,000 to 270,000.

The amount of a silicone compound (C) added is 0.05 to 0.35 parts by weight, preferably 0.10 to 0.30 parts by weight, more preferably 0.15 to 0.25 parts by weight per 100 parts by weight of the polycarbonate resin (A). When the amount added is less than 0.05 parts by weight, sufficient clarity cannot be achieved when an alkali metal or alkaline earth metal salt compound (B) of a perfluoroalkane sulfonic acid is used in combination. In addition, no synergistic flame retardance effect is observed when the amount added exceeds 0.35 parts by weight, making this option unfavorable.

Sufficient clarity and flame retardance cannot be displayed by individually adding the alkali metal or alkaline earth metal salt compound (B) of a perfluoroalkane sulfonic acid and the silicone compound (C) described above to a polycarbonate resin (A). That is, a synergistic effect can be realized by adding an alkali metal or alkaline earth metal salt compound (B) of a perfluoroalkane sulfonic acid and a silicone compound (C) to a polycarbonate resin (A), and a polycarbonate resin film that is self extinguishing with no dripping and a high degree of clarity can be obtained. Furthermore, a polycarbonate resin with excellent clarity and flame retardance and also sufficient consideration for its environmental impact can be presented.

Furthermore, additives such as various thermal stabilizers, antioxidants (phosphorus type and phenol type antioxidants), ultraviolet light absorption agents, coloring agents, fluorescent whitening agents, mold releasing agents, softening agents, antistatic agents, spreading agents (epoxy soy bean oil, fluid paraffins and the like) and the like, impact improving materials and other polymers may also be added within the range that the advantages of the present invention are not adversely impacted. As the thermal stabilizers, metal bisulfate salts such as sodium bisulfate, potassium bisulfate, lithium bisulfate and the like and metal sulfate salts such as aluminum sulfate and the like, for example, may be cited.

The order in which various additive components used in a polycarbonate resin film of the present invention are added and the mixing method used are not particularly restricted. A well known mixer such as a tumbler, ribbon blender and the like, for example, may be used, and the mixture thereof may be easily melted and kneaded using an ordinary single or twin extruder.

The method with which a polycarbonate resin film of the present invention is molded is not particularly restricted, and a well known T die extrusion molding method, calendar molding method and the like may be used. In addition, the average thickness of the flame retardant polycarbonate resin film of the present invention is 200 to 500 μm, preferably 300 to 400 μm. When the average thickness is less than 200 μm, the flame retardance is poor, making this option unfavorable.

In addition, when the thickness exceeds 500 μm, the clarity is poor, making this option unfavorable. Now, a sheet of said thickness is included in the scope of the polycarbonate resin film of the present invention.

EXAMPLES

The present invention is illustrated in the following Examples, but these Examples are not intended to limit the scope of the present invention. Now, the "part" measure is a weight standard unless otherwise noted.

Various formulation components according to the list of formulation components and formulated amounts shown in Tables 2 and 3 were mixed using a tumbler. The mixtures were compounded using a 30 mm diameter twin extruder (manufactured by Nippon Seikosho K.K., model TEX-30A) at a cylinder temperature of 280° C., and pellets of various resin compositions were obtained.

The formulation components used are as described below.
Polycarbonate Resin:
Calibre 200-6 manufactured by Sumitomo Dow Limited (viscosity average molecular weight 24,500, henceforth abbreviated to "PC")
Alkali (alkaline earth) metal salt of a perfluoroalkane sulfonic acid:
Biowet C-4 manufactured by Bayer AG (potassium salt of perfluorobutane sulfonic acid, henceforth abbreviated to "PFBS salt")
Silicone compound (henceforth abbreviated to "silicone compound")
The silicone compound was produced according to a commonly used production method. That is, a suitable amount of diorganodichlorosilane, monoorganotrichlorosilane, tetrachlorosilane or partially hydrolyzed condensation products thereof is dissolved in an organic solvent, water is added to hydrolyze it to form a partially condensed silicone compound and a triorganochlorosilane is further added and allowed to react to complete the polymerization. The solvent is subsequently separated by distillation and the like. The structural characteristics of the silicone compounds synthesized using the method described above are as follows.
The D/T/Q unit ratio in the main chain: 40/60/0 (molar ratio)
Ratio (*) of the phenyl group in total organic functional groups: 60 mole %
Terminal groups: Methyl group only
Weight average molecular weight (**): 15,000
*: The phenyl group was first present in the T units in a silicone containing T units, and the remainder was present in D units. When phenyl groups are attached to the D units, those containing one were preferred. When the phenyl group remained, two were present. With the exception of the terminal groups, the organic functional groups other than phenyl groups are all methyl groups.
**: The weight average molecular weight contained two significant digits.

The pellets of various resin compositions obtained were converted into a film (300 mm wide, average thickness 300 μm) using a T-die extruder (manufactured by Tanabe Plastics, 40 mm single extruder) at a melt temperature of 320° C. and an extrusion rate of 20 kg per hour. The film obtained was used to evaluate the clarity and flame retardance.

The evaluation methods used were as described below.
Clarity:
The degree of haze was measured according to JIS (Japanese Industrial Standards) K7105. Samples with a degree of haze of 5% or lower passed.
Flame Retardance:
The film (300 μm thick) described above was cut into strips 50 mm wide and 200 mm long and was left standing for 72 hours in a constant temperature chamber at a temperature of 23° C. and at 50% humidity. The flame retardance was evaluated according to the UL94 test (a combustion test for plastic parts material for devices) specified by the Underwriters Laboratories. UL94 indicates a method in which the flame retardance is based on the residual flame time of a test piece of a designated size in a vertical position measured after a burner flame has been in contact with the test piece for three seconds and on the drip properties. A sample was classified into the following classes.

TABLE 1

|  | VTM-0 | VTM-1 | VTM-2 |
| --- | --- | --- | --- |
| Residual flame in a specimen | Ten seconds or less | Thirty seconds or less | Thirty seconds or less |
| Total residual flame in five samples | Fifty seconds or less. | Two hundred fifty seconds or less | Two hundred fifty seconds or less |
| Cotton ignition due to dripping | No ignition | No ignition | Ignition |

The residual flame reported in Table 1 refers to the duration of time during which flamed combustion continues on a specimen after an ignition source was distanced from the specimen. The cotton ignition by drips is decided by whether or not a cotton piece placed for identification purposes and positioned about 300 mm from the lower edge of the specimen was ignited by drips.

The evaluation standards considered a film passed when a film with an average thickness of 300 μm was rated at least VTM-1 (that is VTM-1 or VTM-0).

The degree of haze and flame retardance evaluation results are shown in Tables 2 and 3, respectively.

TABLE 2

|  | Examples | | | | | | |
| --- | --- | --- | --- | --- | --- | --- | --- |
|  | 1 | 2 | 3 | 4 | 5 | 6 | 7 |
| PC (parts) | 100 | 100 | 100 | 100 | 100 | 100 | 100 |
| PFBS salt (parts) | 0.13 | 0.15 | 0.16 | 0.15 | 0.15 | 0.15 | 0.15 |
| Silicone compound (parts) | 0.20 | 0.20 | 0.20 | 0.10 | 0.15 | 0.25 | 0.30 |
| Degree of haze 300 μm | 3 | 4 | 4 | 4 | 4 | 5 | 5 |
| UL94 300 μm | VTM-0 | VTM-0 | VTM-0 | VTM-1 | VTM-0 | VTM-0 | VTM-1 |

TABLE 3

|  | Comparative Examples | | | | | | |
| --- | --- | --- | --- | --- | --- | --- | --- |
|  | 1 | 2 | 3 | 4 | 5 | 6 | 7 |
| PC (parts) | 100 | 100 | 100 | 100 | 100 | 100 | 100 |
| PFBS salt (parts) | — | 0.15 | 0.15 | 0.15 | — | 0.05 | 0.30 |
| Silicone compound (parts) | — | — | 0.03 | 0.50 | 0.20 | 0.20 | 0.20 |
| Degree of haze 300 μm | 1 | 8 | 7 | 5 | 2 | 5 | 50 |
| UL94 | VTM-2 | VTM-2 | VTM-1 | NR | NR | VTM-2 | VTM-0 |

\* NR represents a comparative example that did not belong to any flame retardation classification.

As shown in Examples 1 to 7, the clarity and flame retardance were excellent for a film meeting the essential requirements of the present invention.

All of the comparative examples had a problem as shown in Comparative Examples 1 to 7 when the essential requirements of the present invention were not satisfied.

The flame retardance was insufficient in Comparative Example 1 when a metal salt compound and a silicone compound were not present.

The clarity and flame retardance were insufficient in Comparative Example 2 when a silicone compound was not present.

The clarity was insufficient in Comparative Example 3 when the amount of a silicone compound added was less than the specified range.

The flame retardance was insufficient in Comparative Example 4 when the amount of a silicone compound added exceeded the specified range.

The flame retardance was insufficient in Comparative Example 5 when a metal salt compound was not present.

The flame retardance was insufficient in Comparative Example 6 when the amount of a metal salt compound added was less than the lower limit of the specified range.

The clarity was insufficient in Comparative Example 7 when the amount of a metal salt compound added exceeded the specified range.

What is claimed is:

1. A polycarbonate resin film, which is prepared by molding a resin composition, which comprises 100 parts by weight of a polycarbonate resin (A), 0.10 to 0.18 parts by weight of an alkali metal or alkaline earth metal salt compound (B) of a perfluoroalkane sulfonic acid per 100 parts by weight of the polycarbonate resin (A), and 0.05 to 0.35 parts by weight of a silicone compound (C) per 100 parts by weight of the polycarbonate resin (A), wherein the main chain of the silicone compound (C) is branched, the silicone compound (C) contains an organic functional group, the organic functional group includes essentially an aromatic group and optionally includes a hydrocarbon group other than the aromatic group, wherein the film has:
   (1) an average thickness of 200 to 500 μm,
   (2) a degree of haze of 5% or lower as measured according to the conditions specified in JIS K7105, and
   (3) a flame retardance of VTM-1 or VTM-0 at a thickness of 300 μm as measured according to the UL94 test specified by the Underwriters Laboratories (UL).

2. The polycarbonate resin film of claim 1, wherein the alkali metal or alkaline earth metal salt compound (B) of a perfluoroalkane sulfonic acid is an alkali metal salt of a perfluorobutane sulfonic acid.

3. The polycarbonate resin film of claim 1, wherein the amount of the alkali metal or alkaline earth metal salt compound (B) of a perfluoroalkane sulfonic acid is 0.13 to 0.16 parts by weight per 100 parts by weight of the polycarbonate resin (A).

4. The polycarbonate resin film of claim 1, wherein the amount of the silicone compound (C) is 0.10 to 0.30 parts by weight per 100 parts by weight of the polycarbonate resin (A).

5. The polycarbonate resin film of claim 1, wherein the amount of the silicone compound (C) is 0.15 to 0.25 parts by weight per 100 parts by weight of the polycarbonate resin (A).

6. The polycarbonate resin film of claim 2, wherein the amount of the alkali metal salt of the perfluorobutane sulfonic acid is 0.13 to 0.16 parts by weight per 100 parts by weight of the polycarbonate resin (A).

7. The polycarbonate resin film of claim 2, wherein the amount of the silicone compound (C) is 0.10 to 0.30 parts by weight per 100 parts by weight of the polycarbonate resin (A).

8. The polycarbonate resin film of claim 3, wherein the amount of the silicone compound (C) is 0.10 to 0.30 parts by weight per 100 parts by weight of the polycarbonate resin (A).

9. The polycarbonate resin film of claim 6, wherein the amount of the silicone compound (C) is 0.10 to 0.30 parts by weight per 100 parts by weight of the polycarbonate resin (A).

10. The polycarbonate resin film of claim 2, wherein the amount of the silicone compound (C) is 0.15 to 0.25 parts by weight per 100 parts by weight of the polycarbonate resin (A).

11. The polycarbonate resin film of claim 3, wherein the amount of the silicone compound (C) is 0.15 to 0.25 parts by weight per 100 parts by weight of the polycarbonate resin (A).

12. The polycarbonate resin film of claim 4, wherein the amount of the silicone compound (C) is 0.15 to 0.25 parts by weight per 100 parts by weight of the polycarbonate resin (A).

13. The polycarbonate resin film of claim 6, wherein the amount of the silicone compound (C) is 0.15 to 0.25 parts by weight per 100 parts by weight of the polycarbonate resin (A).

14. The polycarbonate resin film of claim 7, wherein the amount of the silicone compound (C) is 0.15 to 0.25 parts by weight per 100 parts by weight of the polycarbonate resin (A).

15. The polycarbonate resin film of claim 8, wherein the amount of the silicone compound (C) is 0.15 to 0.25 parts by weight per 100 parts by weight of the polycarbonate resin (A).

16. The polycarbonate resin film of claim 9, wherein the amount of the silicone compound (C) is 0.15 to 0.25 parts by weight per 100 parts by weight of the polycarbonate resin (A).

\* \* \* \* \*